United States Patent
Yamaoka

(10) Patent No.: US 7,600,242 B2
(45) Date of Patent: Oct. 6, 2009

(54) PROGRAM DETAIL INFORMATION DISPLAY APPARATUS AND METHOD THEREOF

(75) Inventor: Masahito Yamaoka, Osaka (JP)

(73) Assignee: Panasonic Corporation, Osaka (JP)

(*) Notice: Subject to any disclaimer, the term of this patent is extended or adjusted under 35 U.S.C. 154(b) by 694 days.

(21) Appl. No.: 10/488,641

(22) PCT Filed: Apr. 21, 2003

(86) PCT No.: PCT/JP03/05041

§ 371 (c)(1),
(2), (4) Date: Oct. 13, 2004

(87) PCT Pub. No.: WO03/090454

PCT Pub. Date: Oct. 30, 2003

(65) Prior Publication Data

US 2005/0066360 A1 Mar. 24, 2005

(30) Foreign Application Priority Data

Apr. 22, 2002 (JP) .............................. 2002-118888
Apr. 17, 2003 (JP) .............................. 2003-112365

(51) Int. Cl.
  *G06F 13/00* (2006.01)
  *H04N 5/445* (2006.01)
(52) U.S. Cl. ..................... 725/40; 725/142; 725/46; 725/45
(58) Field of Classification Search ............ 725/40, 725/41, 45, 46, 142
See application file for complete search history.

(56) References Cited

U.S. PATENT DOCUMENTS

| 6,147,714 | A | 11/2000 | Terasawa et al. |
| 6,557,016 | B2 * | 4/2003 | Tanigawa et al. ......... 715/501.1 |
| 6,661,468 | B2 * | 12/2003 | Alten et al. ................. 348/569 |
| 6,934,965 | B2 * | 8/2005 | Gordon et al. ............... 725/54 |
| 7,096,487 | B1 * | 8/2006 | Gordon et al. ............... 725/91 |
| 2002/0078447 | A1 * | 6/2002 | Mizutome et al. ............. 725/37 |
| 2002/0147984 | A1 * | 10/2002 | Tomsen et al. .............. 725/109 |
| 2003/0159144 | A1 * | 8/2003 | Kitagawa et al. ............. 725/44 |
| 2006/0271981 | A1 * | 11/2006 | Ando et al. .................. 725/90 |

FOREIGN PATENT DOCUMENTS

CN 1339220 A 3/2002

(Continued)

OTHER PUBLICATIONS

Supplementary European Search Report for Application No. EP 03 72 5614 dated May 31, 2007.

(Continued)

*Primary Examiner*—Christopher Kelley
*Assistant Examiner*—Charles N Hicks
(74) *Attorney, Agent, or Firm*—RatnerPrestia

(57) ABSTRACT

A program detail information display apparatus comprises a display unit, a storage unit for storing program data including program detail information, a program detail information extracting unit for extracting at least program detail information from the program data stored in the storage unit, and a program detail information sequential display control unit for issuing the program detail information extracted by the program detail information extracting means sequentially to the display unit. The program detail information display apparatus can enhance the efficiency of selection of programs by the viewer.

17 Claims, 12 Drawing Sheets

FOREIGN PATENT DOCUMENTS

| | | |
|---|---|---|
| GB | 2 365 651 A | 2/2002 |
| JP | 7-284035 | 10/1995 |
| JP | 11-155110 | 6/1999 |
| JP | 11-266413 | 9/1999 |
| JP | 2000-13708 | 1/2000 |
| JP | 2000-278624 | 10/2000 |
| JP | 2002-271710 | 9/2002 |
| KR | 1999-077887 | 10/1999 |
| WO | WO 01/43429 | 6/2001 |

OTHER PUBLICATIONS

International Search Report corresponding to application No. PCT/JP03/05041 dated Aug. 5, 2003.

\* cited by examiner

FIG. 5

| Channel information | Program information | Program detail information |
|---|---|---|
| 022, ○○ Broadcasting | Movie Theater 21:00-22:55 | Synopsis, ○○○... |
| 034, △△Television | △△ Drama 20:00-20:55 | Synopsis, △△... |
| 034, △△Television | △ Road Show 21:00-22:55 | Today's story, △△△... |

PROGRAM DETAIL INFORMATION DISPLAY APPARATUS AND METHOD THEREOF

This Application is a U.S. National Phase Application of PCT International Application PCT/JP03/05041.

TECHNICAL FIELD

The present invention relates to a display apparatus of television program detail information or the like.

BACKGROUND ART

A conventional program detail information display apparatus is designed to display the program detail information by the manipulation of the viewer to designate a desired program, obtain the detail information of the program, and instruct to display.

That is, the viewer manipulates in this manner to display the program detail information transmitted in every program of every channel, and selects the program by referring to the displayed program detail information. This program detail information is the information including the synopsis, names of the cast, etc.

In other method, the user designates a desired program actively by using the display function of program list and program retrieval function by program genre.

In these methods, however, the program detail information display screen is displayed in a separate screen from the program list, or the screen is changed over from the program list to the program detail information display screen, and it is hard to understand the correspondence between the program detail information and program. Besides, the user's operation is complicated.

To solve such problems, a apparatus for displaying the program detail information directly in the program list is proposed in Japanese Laid-open Patent No. H11-155110.

The conventional methods are explained below by referring to FIG. 12. FIG. 12 shows a screen displaying program detail information in the program list. In the diagram, the vertical direction at the right side of a screen 1200 is a channel column 1210, and the lateral direction is a time column 1260. Channels 1220, 1230, 1240, 1250 are individual channels. In channel 1220, programs are displayed along the time column 1260 in the lateral direction. For example, from time 12:00 to time 13:00, a program 1221 is broadcast. Similarly, a program 1231 is one of the programs broadcasted in channel 1230, a program 1241 is one of the programs broadcasted in channel 1240, and a program 1251 is one of the programs broadcast in channel 1250.

Upon start of display of the program list, display frames are formed in each channel by dividing in a uniform width in the vertical axis direction (direction of channel column 1210) and in uniform time unit width in the lateral axis direction (direction of time column 1260).

The viewer designates a program by moving the cursor to the position of a program name desired to know the detail information out of the program names displayed in the program list displayed on the screen 1200. At this moment, the detail information of the program corresponding to the cursor position is taken out from a specified database, and displayed as program detail information. The column of the program corresponding to the cursor position is magnified in the direction of the channel column 1210 and in the direction of the time column 1260 so that the program detail information and program name may be displayed in a proper size.

In FIG. 12, the cursor is positioned at the program 1241, and the program 1241 is designated. The viewer does not designate the program 1221, program 1231 or program 1251, only the program titles are displayed in these columns. On the other hand, the column of the program 1241 displays the program detail information such as the synopsis and the cast, together with the program title.

In such apparatus, the user must designate a desired program by moving the cursor to each program and display the program detail information, out of a tremendous number of programs displayed on the program list, and select the program by referring to the displayed program detail information. In such method, the operation is very complicated and practically difficult.

In another prior art, the viewer is not required to select each program from the program list, but by using the viewer's preference information, preferred programs for the viewer are selected and recommended from a huge list of programs. This prior art is based on the preference of the viewer. In other words, programs recommended by the program provider cannot be presented to the user without requiring the viewer's preference information.

In the multichannel trend of television broadcast, the number of programs is increasing enormously, and these problems will become more and more serious. It is hence extremely difficult for the viewer to designate a program actively from the program list by program retrieval by program list or program genre, and display the program detail information and select a program.

Yet, the conventional program detail information display apparatus has no means for telling the programs recommended by the program provider.

DISCLOSURE OF THE INVENTION

A program detail information display apparatus comprises at least:

display means, storage means for storing program data, program detail information extracting means for extracting at least program detail information from the program data stored in the storage means, and program detail information sequential display control means for displaying the program detail information extracted by the program detail information extracting means sequentially in the display means.

A program detail information display method comprises at least:

a step of displaying video data and the like, a step of storing program data, a step of extracting at least program detail information from the program data stored at the step of storing, and a step of controlling sequentially so as to display sequentially the program detail information extracted at the step of extracting the program detail information.

BRIEF DESCRIPTION OF THE DRAWINGS

FIG. 5 is an example of program detail list for display in program detail information display apparatus in preferred embodiment 1.

DETAILED DESCRIPTION OF THE PREFERRED EMBODIMENT

The program detail information display apparatus of the invention is intended to enhance the efficiency of selection of programs by the viewer by sequential output of extracted program detail information in the display means.

Further, by extracting only the program detail information larger than a specific size, recommended programs can be efficiently presented to the viewer.

Considering that program detail information is not provided in all programs, and that a greater quantity of program detail information is added to the programs recommended by the program provider, the invention is intended to enhance the efficiency of selection of programs by the viewer by displaying the program detail information of programs with a greater quantity of program detail information to the viewer.

Besides, by processing the program detail information by using video and audio data, and sequentially displaying on the same screen as ordinary television program, the invention is intended to allow the viewer to acquire the program detail information passively for the ease of selection of programs.

Preferred Embodiment 1

Preferred embodiment 1 is described below while referring to FIG. 1 to FIG. 9.

Figure 1:
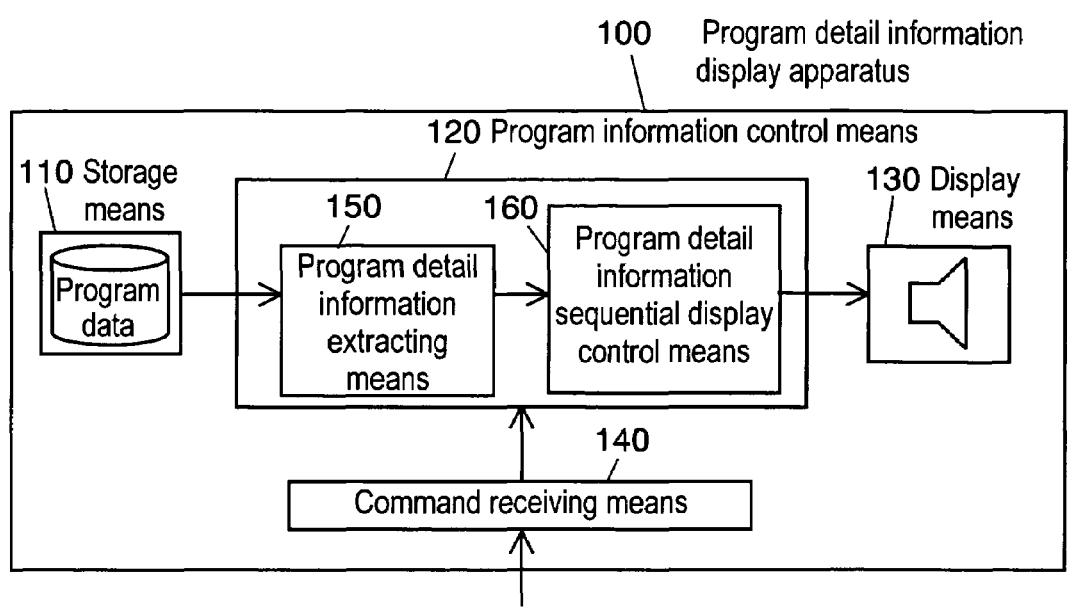
FIG. 1 is a system block diagram of program detail information display apparatus in a preferred embodiment of the invention.

FIG. 1 is a system block diagram of program detail information display apparatus in preferred embodiment 1 and preferred embodiment 2.

In FIG. 1, a program detail display apparatus 100 comprises storage means 110, program detail information control means 120, display means 130, and command receiving means 140. The program detail information control means 120 is composed of program detail information extracting means 150 and program detail information sequential display control means 160.

The storage means 110 stores the program data, and the program detail information extracting means 150 extracts the program detail information from the program data stored in the memory means 110. The program detail information sequential display control means 160 receives the program detail information extracted by the program detail information extracting means 150. Consequently, the program detail information sequential display means 160 operates so that the display means 130 may sequentially execute display and notice of program detail information and others. The display means 130, receiving the output of the program detail information sequential display control means 160, executes display and notice of program detail information and others. The command receiving means 140 receives program detail information display command from a remote controller or the like, and controls the operation of the program detail information control means 120 on the basis of the received data.

The system block diagram in FIG. 1 is further specifically shown in a system block diagram in FIG. 2, and a detailed description is given below together with FIG. 2.

Figure 2:
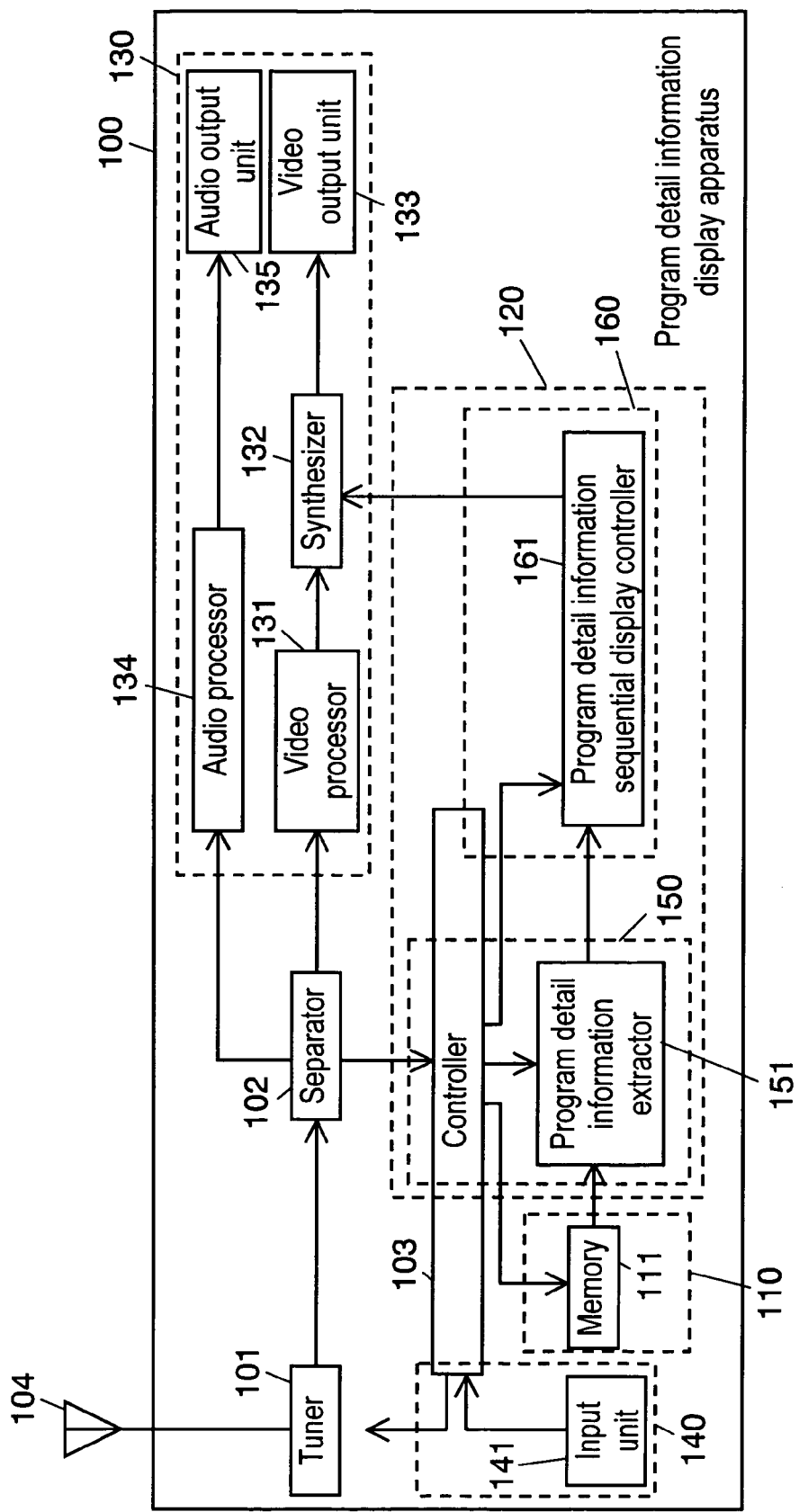
FIG. 2 is a specific system block diagram of program detail information display apparatus in preferred embodiment 1 of the invention.

In FIG. 2, the program detail information display apparatus 100 comprises an antenna 104, a tuner 101, a separator 102, a controller 103, a memory 111, a program detail information extractor 151, program detail information sequence controller 161, a video processor 131, a synthesizer 132, a video output unit 133, an audio processor 134, an audio output unit 135, and an input unit 141. The command receiving means 140 is composed of the input unit 141 and controller 103, and the storage means 110 is composed of the memory 111. The program detail information extracting means 150 is composed of the controller 103 and the program detail information extractor 151, and the program detail information sequential display control means 160 is composed of the controller 103 and program detail information sequence controller 161. The display means 130 is composed of the video processor 131, synthesizer 132, video output unit 133, audio processor 134, and audio output unit 135. The program detail information control means 120 is composed of the program detail information extracting means 150 and program detail information sequential display control means 160. The command receiving means 140, storage means 110, program detail information extracting means 150, program detail information sequential display control means 160, display means 130, and program detail information control means 120 correspond respectively to the command receiving means 140, storage means 110, program detail information extracting means 150, program detail information sequential display control means 160, display means 130, and program detail information control means 120 shown in FIG. 1.

The antenna 104 receives an incoming radio wave, converts into an electric signal of radio frequency, and supplies into the tuner 101. The electric signal of radio frequency entered from the antenna 104 to the tuner 101 is a signal of broad frequency band enveloping multiple carrier channels. First of all, the tuner 101 receives a tuning start command from the controller 103, and extracts a signal corresponding to a desired carrier channel. The extracted radio frequency signal of carrier channel is processed by channel decoding. Channel decoding is demodulation from so-called digital modulation. Generally, PSK modulation of higher order or QAM modulation of higher order is employed. Channel decoding is to restore the digital data before modulation from the signal modulated in such modulating system. The tuner 101 also executes error correction decoding process, and a transport stream is restored and sent to the separator 102.

The separator 102 decodes the transport stream entered from the tuner 101. The transport stream entered from the tuner 101 is a data stream having various pieces of information multiplexed in time in transport stream packet units. That is, the transport stream is a time multiplexed composition of packet of digital video data, packet of digital audio data, packet of program data, and others. The separator 102 separates the entered transport stream into a packet of digital video signal, a packet of digital audio signal, and a packet of program data. The separated packet of digital video signal is converted into a digital video signal data stream, and is put into the video processor 131. The separated packet of digital audio signal is converted into a digital audio signal data stream, and is put into the audio processor 134. The separated packet of program data is put into the controller 103 as program data.

The controller 103 delivers the program data entered from the separator 102 into the memory 111. The controller 103 also command tuning start to the tuner 101 on the basis of channel selection request from the input unit 141. Further, the controller 103 feeds a program detail information extraction request to the program detail information extractor 151 on the basis of the recommended program display request or the like from the input unit 141. In this preferred embodiment, an example of recommended program display request is used as program detail information display command.

The memory 111 stores the program data entered from the controller 103.

The program detail information extractor 151 acquires program data from the memory 111 and extracts the program detail information when program detail information extraction is requested from the controller 103. A list of program detail for display obtained as a result of program detail information extraction process is sent out to the program detail information sequence controller 161.

The program detail information sequence controller 161 compiles program detail data for display on the basis of the list of program detail for display from the program detail information extractor 151, converts the program detail data for display into program detail signal for display of analog video signal format, and issues sequentially to the synthesizer 132. Generally, the program detail list information for display issued from the program detail information extractor 151 is data coded as specified. Therefore, the program detail information sequence controller 161 also has a function of decoding the coded data into characters, and further converting into video data.

The coded data may include moving image, still image, and other related information. The program detail information sequence controller 161 further has a function of decoding such related information, and converting into video data.

The video processor 131 decodes the video signal data stream entered from the separator 102. In digital television broadcast, the video signal is compressed by a specified video compression method (so-called source coding), and composed into a video signal data stream of specified format. Decoding executed in the video processor 131 is decoding of video data before compression on the basis of the above video signal data stream, which is so-called source decoding. The video processor 131 processes in this manner, and converts into analog video signal, and issues to the synthesizer 132.

The synthesizer 132 synthesizes the analog video signal from the video processor 131 and the program detail signal for display from the program detail information sequence controller 161, and issues the synthesized analog video signal to the video output unit 133.

The video output unit 133 is a display apparatus composed of monitor and others, and displays the analog video signal from the synthesizer 132.

The audio processor 134 decodes the digital audio signal data stream entered from the separator 102. In digital television broadcast, the audio signal is compressed by a specified audio compression method (so-called source coding), and composed into an audio signal data stream of specified format. Decoding executed in the audio processor 134 is decoding of audio data before compression on the basis of the above audio signal data stream, which is so-called source decoding. The audio processor 134 processes in this manner, and converts into analog audio signal, and issues to the audio output unit 135.

The audio output unit 135 is an audio output apparatus composed of loudspeaker and others, and delivers analog audio signal from the audio processor 134.

The input unit 141 sends the channel selection request from the viewer or program display request to the controller 103.

In this explanation, the synthesizer 132 synthesizes the analog video signal from the video processor 131 and the program detail signal for display of analog video signal from the program detail information sequence controller 161. Alternatively, however, the video processor 131 may issue a digital video signal, the program detail information sequence controller 161 may issue a program detail signal for display of digital video signal, and the synthesizer 132 may synthesize the digital video signal from the video processor 131 and the program detail signal for display of digital video signal from the program detail information sequence controller 161.

Synthesizing process in the synthesizer 132 includes a method of replacing part of the video signal form the video processor 131 with the program detail signal for display from the program detail information sequence controller 161, a superimposing method by weighted sum of both signals, chroma key or other keying method. When merely synthesizing both signals, part of the video signal from the video processor 131 may be missing or may be hard to see due to the program detail signal for display. To avoid such inconvenience, the synthesizer 132 compresses the video signal from the video processor 131 one-dimensionally or two-dimensionally within the plane, and the program detail signal for display from the program detail information sequence controller 161 may be positioned in the vacant region resulting from the compression. The synthesizer 132 in this preferred embodiment may also synthesize in such process.

Figure 3:
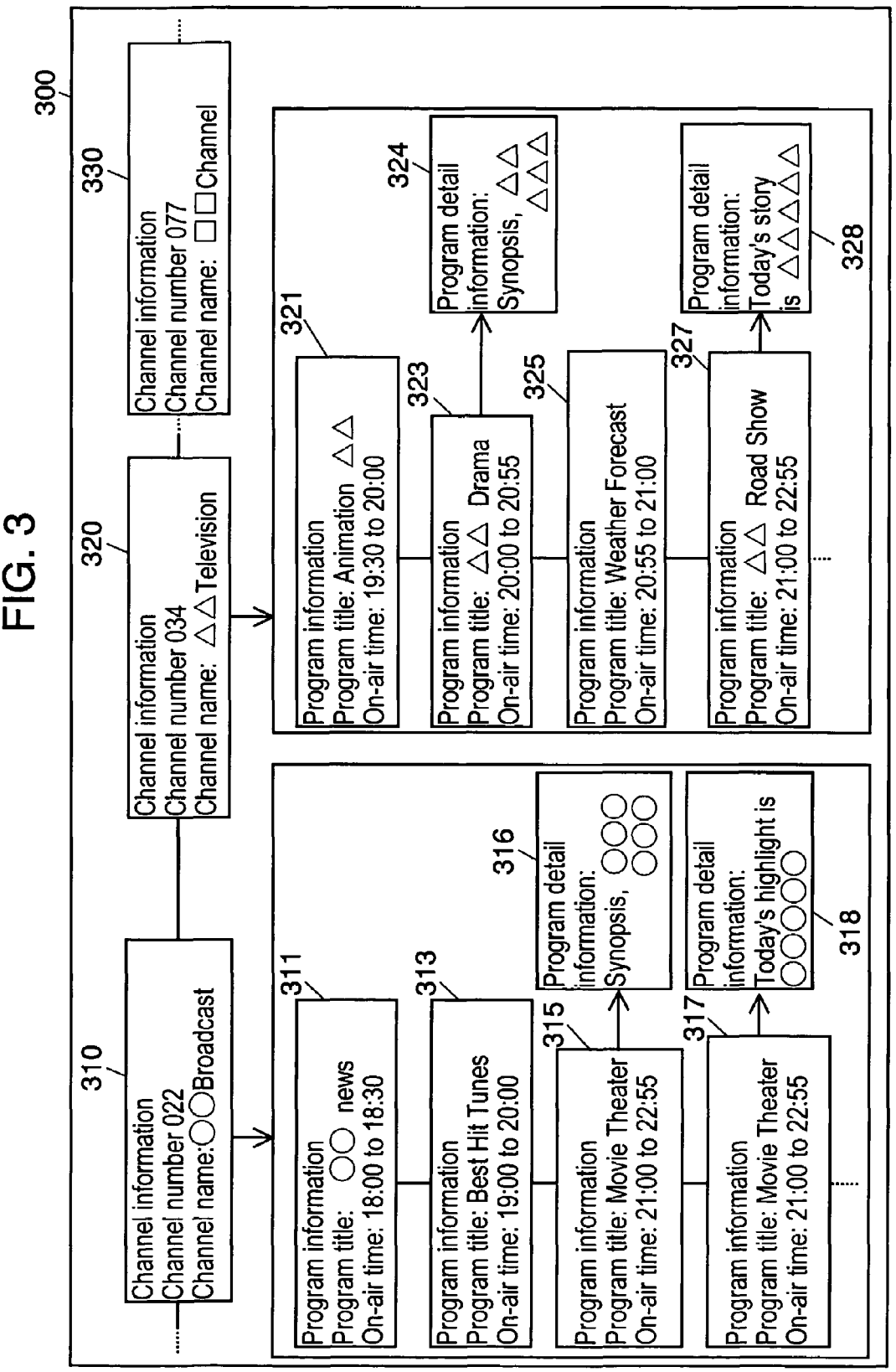
FIG. 3 is a conceptual diagram of data composition of program data in preferred embodiment 1 of the invention.

The data composition of the program data in the preferred embodiment, that is, the data composition of the program data issued from the separator 102 is explained by referring to FIG. 3.

FIG. 3 is a conceptual diagram of data composition of program data in the preferred embodiment.

In FIG. 3, program data 300 is composed of channel information 310, 320, 330, program information 311, 313, 315, 317, 321, 323, 325, 327, and program detail information 316, 318, 324, 328. The channel information 310, 320, 330 are composed of channel number and channel name relating to each channel. The program information 311, 313, 315, 317, 321, 323, 325, 327 are composed of the title and on-air time of the program broadcast in each channel. The program detail information 316, 318, 324, 328 are additional information to the program information, and are composed of synopsis and highlight scenes.

The channel information 310 has the data meaning the channel number of 022 and channel name of □□ Broadcast, the channel information 320 has the data meaning the channel number of 034 and channel name of □□ Broadcast, and the channel information 330 has the data meaning the channel number of 077 and channel name of □□ Broadcast.

The channel information 310 includes program information 311, 313, 315, 317, and the program information 315, 317 have program detail information 316, 318, respectively. However, the program information 311, 313 do not have program detail information.

Similarly, the channel information 320 includes program information 321, 323, 325, 327, and the program information 323, 325 have program detail information 324, 328, respectively. However, the program information 321, 325 do not have program detail information.

For example, in the case of the program information 315, the program information and program detail information are explained. The program information 315 has the data meaning the program title of Movie theater and the on-air time of 21:00 to 22:55, and also has the program detail information 316. The program detail information 316 has the data meaning the synopsis "Synopsis: ○○○○○○○○".

Other detail information and program detail information are same as in the program information 315 and program detail information 316, and specific description is omitted.

Herein, it is assumed that the program detail information 316, 324, 328 have a data quantity not less than the specified size, while the program detail information 318 has a data quantity smaller than the specified size.

The program data 300 has the data composition as described above.

The display operation of the program detail information in the preferred embodiment is explained below by referring to FIG. 1 in the first place.

In the program detail information display apparatus 100 in FIG. 1, the command receiving means 140 receives a recommended program display request or the like as one of the program detail information display commands from the remote controller or the like, and it is noticed to the program control means 120.

The program detail information extracting means 150 of the program information control means 120 receiving the notice of reception of program detail information display command acquires the program information stored in the memory 110. The program detail information extracting means 150 extracts the channel information, program information, and program detail information in the procedure shown in FIG. 4, and compiles a program detail list for display.

The program detail information sequential display control means 160 compiles program detail data for display from the channel information, program information, and program detail information extracted by the program detail information extracting means 150, and sequentially issues to the display means 130.

The display means 130 receives the output of the program detail information sequential display control means 160, and displays sequentially.

Figure 4:
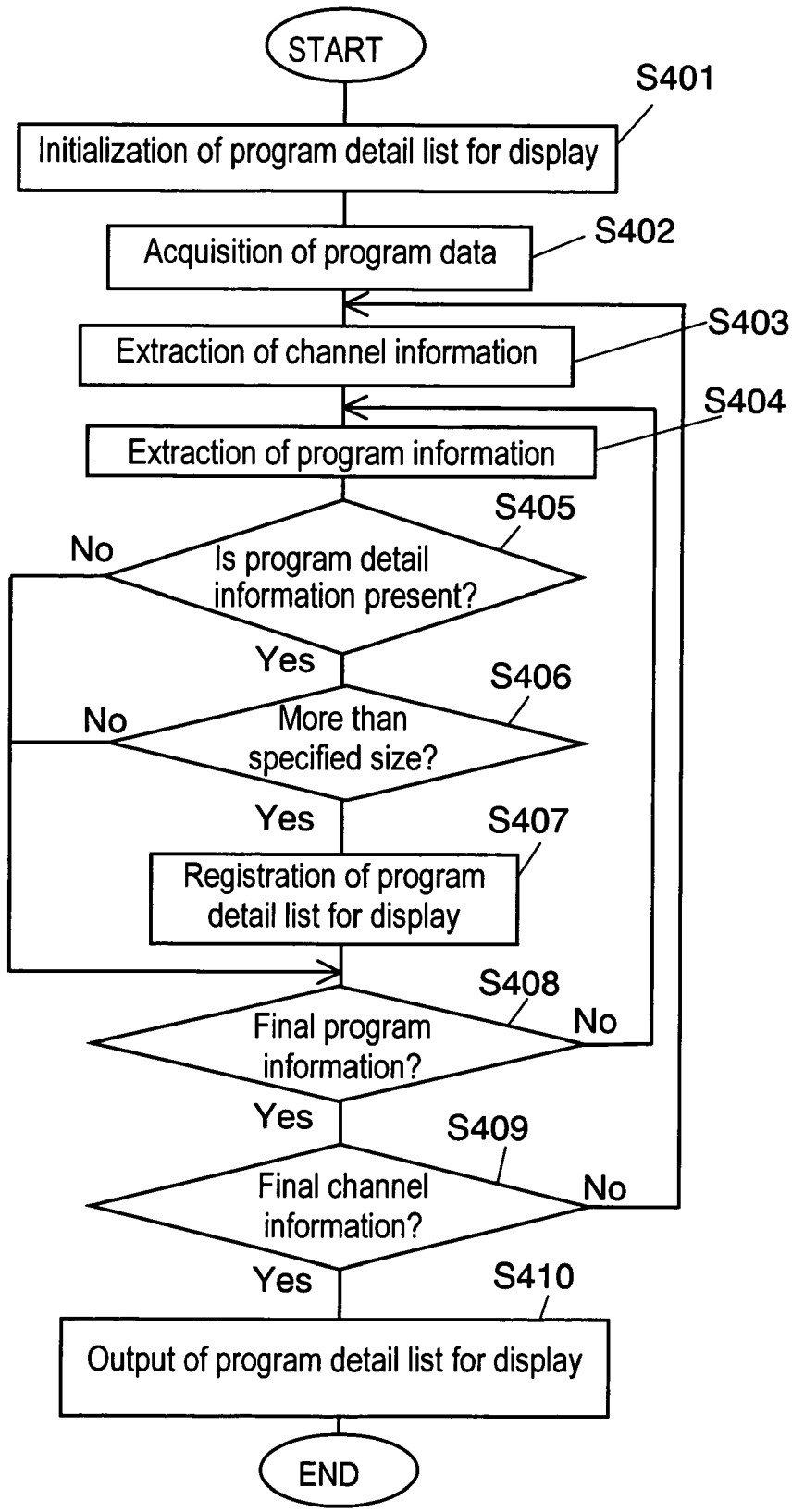
FIG. 4 is an operation flowchart of program detail information extracting process in preferred embodiment 1 of the invention.

Referring now to FIG. 4, an outline of operation of the program detail information extracting means 150 in FIG. 1 is explained below.

To begin with, the program detail information extracting means 150 extracts the channel information from the program data (S403).

Next, the program detail information extracting means 150 checks the channel number of the extracted channel information, and extracts the corresponding program information (S404).

The program detail information extracting means 150 further checks if the program detail information corresponding to the extracted program information is present or not (S405).

If the program detail information is present, the program detail information extracting means 150 detects the size of the program detail information (S406).

If the program detail information is not present, the program detail information extracting means 150 judges if the program information is the final program information or not (S408).

When the size of the program detail information is more than a specified number of bytes, the program detail information extracting means 150 registers this program detail information in the program detail list for display (S407).

If not more than the specified number of bytes, the program detail information extracting means 150 judges if the program information is the final program information or not (S408).

The program detail information extracting means 150 checks if the program information being checked at the present is the final program information about the channel or not (S408).

If final, the program detail information extracting means 150 detects whether the channel information being checked is the final channel information in the number data or not (S409).

If not final, the program detail information extracting means 150 extracts new program information (S404).

If the channel number being checked is not the final channel information in the number data, the program detail information extracting means 150 extracts new channel information (S403).

If the channel number being checked is final, the program detail information extracting means 150 terminates the processing (End).

Referring next to FIG. 4, the operation of the program detail information extractor 151 shown in FIG. 2 is explained below.

In the program detail information display apparatus 100 in FIG. 2, the input unit 141 operating as the command receiving means 140 receives a recommended program display request or the like as one of the program detail information display commands from the remote controller or the like, and it is notice to the controller 103 in the program control means 120.

The controller 103 consequently starts operation of the program detail information extractor 151. The program detail information extractor 151 acquires the program data stored in the memory 111, and extracts channel information, program information, and program detail information. FIG. 4 shows this operation procedure.

In FIG. 4, the program detail information extractor 151 starts processing according to the instruction from the controller 103 (Start).

As a result, the program detail information extractor 151 initializes the program detail list for display (S401).

The program detail information extractor 151 acquires program data stored in the memory 111 (S402).

The program detail information extractor 151 extracts channel information from the acquired program data (S403).

The program detail information extractor 151 extracts program information about the extracted channel information (S404).

The program detail information extractor 151 judges if the program detail information about the extracted program information is present or not (S405).

When it is judged that the program detail information bout the extracted program information is present (Yes), the program detail information extractor 151 judges if the program detail information is more than a specified size or not (S406).

When the program detail information is judged to be larger than the specified size (Yes), the program detail information extractor 151 registers this program detail information in the program detail list for display (S407).

Further, the program detail information extractor 151 judges if the program information is the final program information or not (S408).

If it is judged that the program detail information about the extracted program information is not present (No), or if it is judged the program detail information about the extracted program information is not larger than the specified size (No), the program detail information extractor 151 judges if the program information is the final program information or not (S408).

When the program information is not judged to be the final program information (No), the program detail information extractor 151 extracts next program information newly (S404).

On the other hand, if the program information is judged to be the final program information, the program detail information extractor 151 judges if the channel information is the final channel information or not (S409).

When the channel information is not judged to be the final channel information (No), the program detail information extractor 151 extracts next channel information newly (S403).

On the other hand, when the channel information is judged to be the final channel information (Yes), the program detail information extractor 151 issues the program detail list for display to the program detail information sequential display controller 161 (S410).

Finally, a series of processing of the program detail information extractor 151 is over (End).

FIG. 5 shows a program detail list for display created in the program detail information extractor 151 and entered in the program detail information sequential display controller 161.

In the diagram, the left end row of the program detail list for display 501 is a channel information column 510, the middle row is a program information column 520, and the right end row is a program detail information column 530.

As clear from the explanation of the flowchart shown in FIG. 4, the program detail information extractor 151 compiles a program detail list for display by extracting when the program detail information has a quantity of data larger than a specified size. That is, among the program data 300 shown in FIG. 3, the program information 315 and program detail information 316 of channel information 310, the program information 323 and program detail information 324 of channel information 320, and the program information 327 and program detail information 328 of channel information 320 are extracted, and registered in the program detail list for display 501. The program detail information 318 of which program detail information is not more than the specified data quantity is not hence registered in the program detail list for display 501. Therefore, the channel information 310, program information 315 and program detail information 316 in FIG. 3 correspond respectively to the channel information 511, program information 521 and program detail information 531 in FIG. 5. Similarly, the channel information 320, program information 323 and program detail information 324 in FIG. 3 correspond respectively to the channel information 512, program information 522 and program detail information 532 in FIG. 5. Also, the channel information 320, program information 327 and program detail information 328 in FIG. 3 correspond respectively to the channel information 513, program information 523 and program detail information 533 in FIG. 5.

Processing in the program detail information sequential display controller 161 is explained below while referring to FIG. 6.

Figure 6:
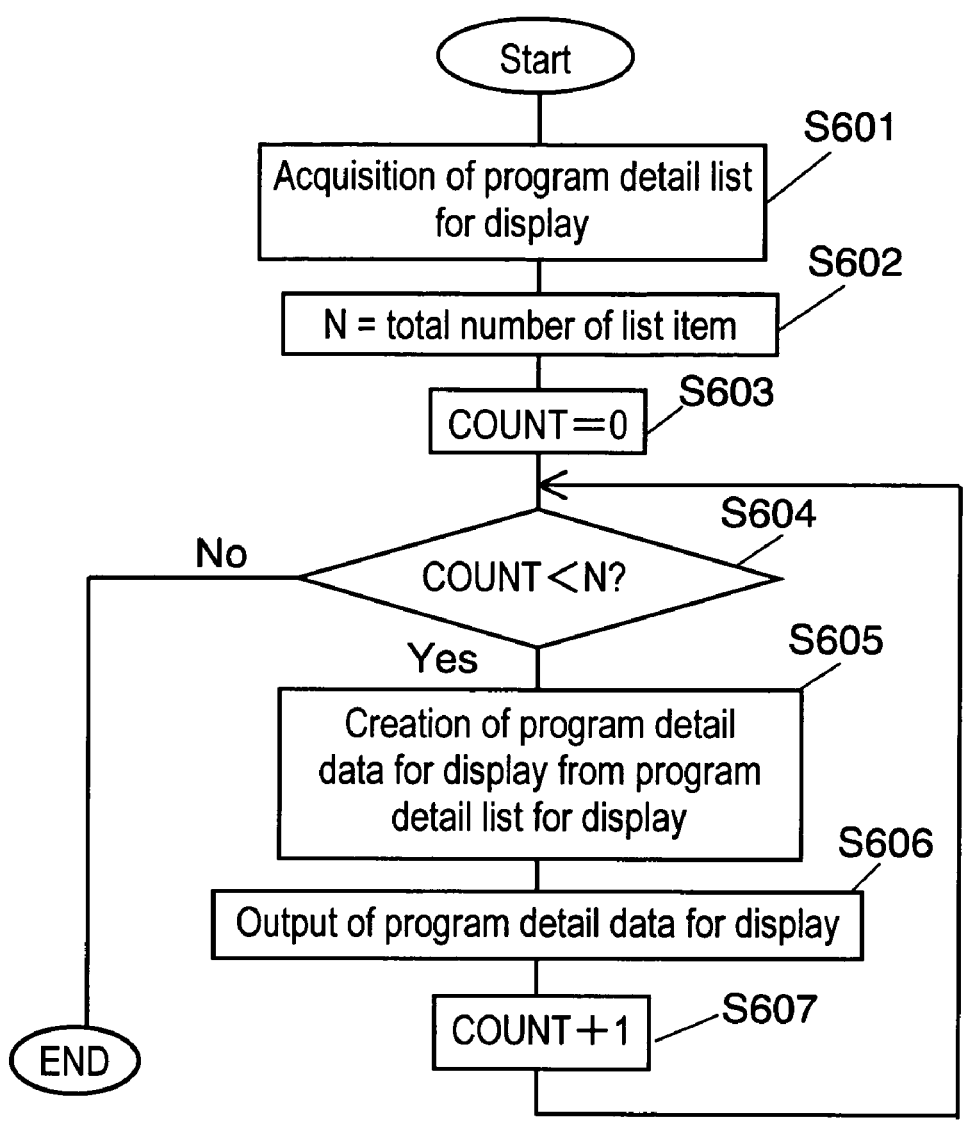
FIG. 6 is a flowchart of making process of program detail data for display in program detail information display apparatus in preferred embodiment 1.

In FIG. 6, the program detail information sequential display controller 161 in FIG. 2 receives an instruction from the controller 103, and starts processing (Start).

The program detail information sequential display controller 161 acquires a program detail list for display created in the program detail information extractor 151 (S601).

Further, the program detail information sequential display controller 161 detects the total number of list items included in the acquired program detail list for display. The detected total number is supposed to be N (S602).

In this preferred embodiment, the program detail list for display is as shown in FIG. 5. The total number of list items N is 3 in this case.

In succession, the program detail information sequential display controller 161 resets the own counter number (COUNT) to 0 (S603).

In the preferred embodiment, the program detail list for display is as shown in FIG. 5. Therefore, the COUNT value of 0 corresponds to channel information 511, program information 521, and program detail information 531 in FIG. 5. Similarly, the COUNT value of 1 corresponds to channel information 512, program information 522, and program detail information 532 in FIG. 5, and the COUNT value of 2 corresponds to channel information 513, program information 523, and program detail information 533 in FIG. 5.

Next, the program detail information sequential display controller 161 judges if the present COUNT value is smaller than N or not (S604).

When the present COUNT value is judged to be smaller than N (Yes), the program detail information sequential display controller 161 creates program detail data for display corresponding to the COUNT value on the basis of the information corresponding to the COUNT value in the program detail list for display (S605).

At this moment, the COUNT value is still 0, and the program detail data for display corresponding to channel information 511, program information 521, and program detail information 531 in FIG. 5 is created.

Further, the program detail information sequential display controller 161 sends the created program detail data for display to the synthesizer 132 (S606).

Successively, the program detail information sequential display controller 161 increments by adding 1 to the COUNT value (S607).

Next, the program detail information sequential display controller 161 judges if the newly incremented COUNT value is smaller than N or not (S604).

Such process is repeated, and finally the newly incremented COUNT value is not judged to be smaller than N (No).

When the COUNT value is not judged to be smaller than N, the program detail information sequential display controller 161 terminates the processing (End).

In this way, the program detail information sequential display controller 161 issues the created program detail data for display sequentially to the synthesizer 132.

In this description, the program detail information sequential display controller 161 issues the program detail data for display to the synthesizer 132 sequentially every time the program detail data for display is created (S606). However, preferred embodiment 1 of the invention is not limited to such system alone. That is, while storing the created program detail data for display, the controller 103 may display the desired data from the stored program detail data for display at a desired timing, on the basis of an input signal entering the input unit 141 or the like.

A display screen example of thus composed program detail information is explained briefly below by referring to FIG. 7.

Figure 7:
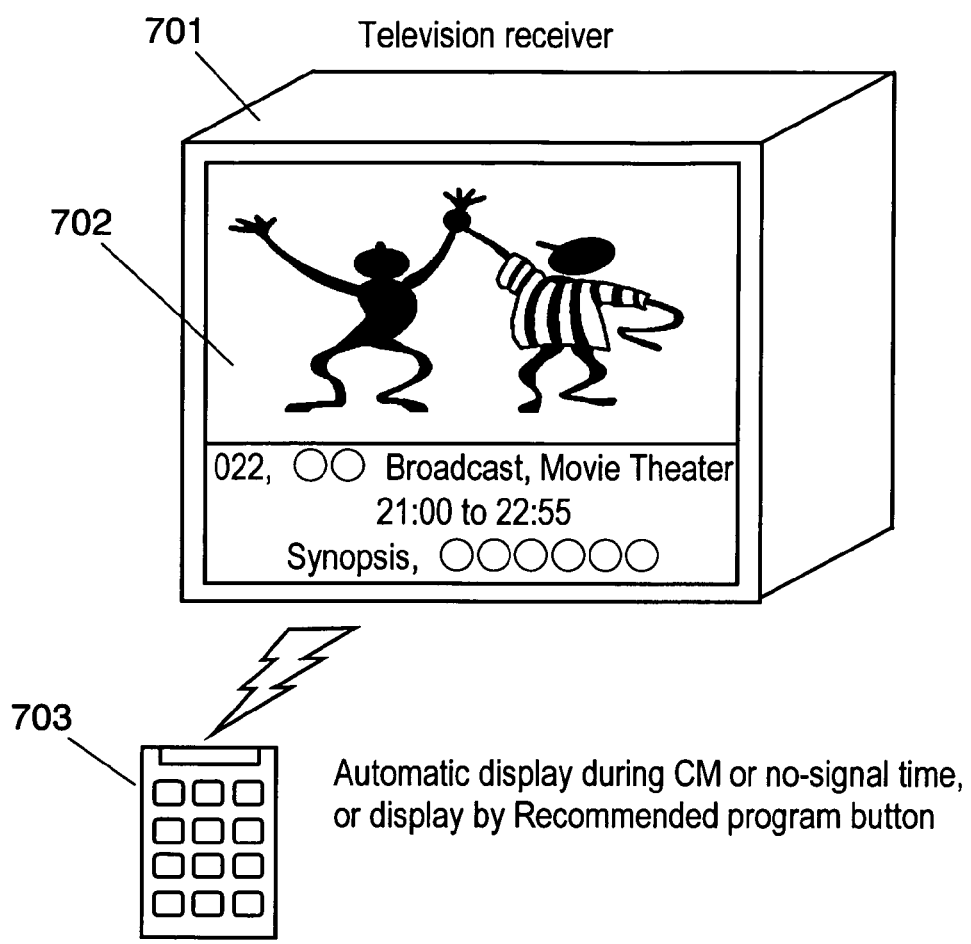
FIG. 7 is an example of display screen of program detail information in program detail information display apparatus in preferred embodiment 1.

In FIG. 7, a display apparatus such as television receiver 701 is controlled by a remote controller 703. A display screen 702 is controlled by the remote controller 703, and displays the broadcast image, channel information, and program detail information. Display procedure of program detail information includes display during commercial message, display in no-signal time, automatic display in such cases, display when "Recommended Program" button is pressed, etc. The viewer decides and sets to execute which display procedure by manipulating the remote controller 703.

A further specific example of display screen of program detail information is described below.

Figure 8:
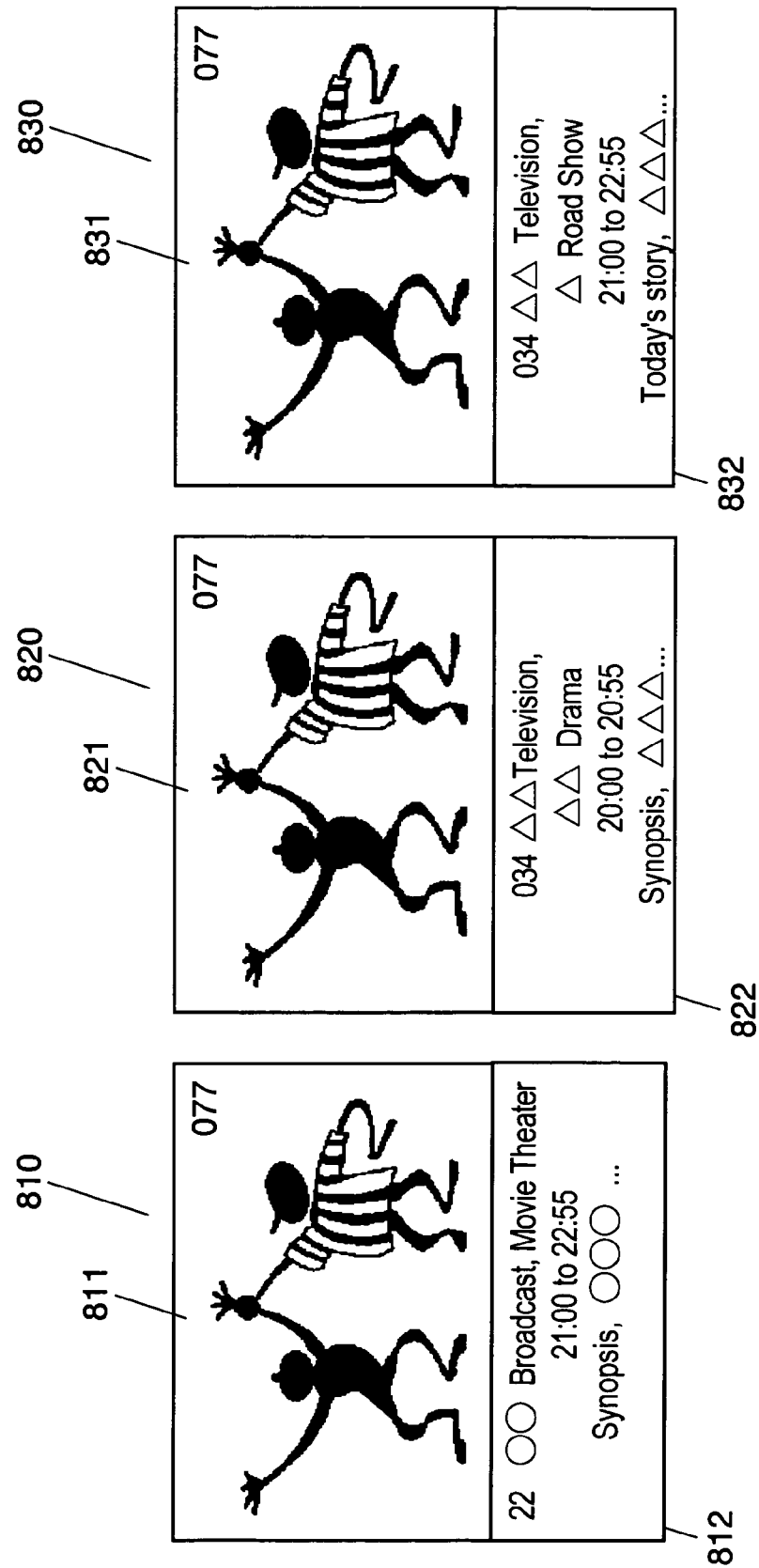
FIG. 8 is a diagram showing an example of a further specific display screen of program detail information in preferred embodiment 1 of the invention.

FIG. 8 is an example of screen display in the video output unit 133 in FIG. 2. In FIG. 8, screens 810, 820, 830 are screens at different times of the display screen 702 in FIG. 7. An image region 811 is a region for display of an output image from the video processor 131 in FIG. 2, and an image region 812 is a region for display of information from the program detail information sequential display controller 161. Similarly, image regions 821 and 831 are regions for display of output images from the video processor 131 in FIG. 2, and regions 822 and 832 are regions for display of information from the program detail information sequential display controller 161.

The screen 810 shows a state of display of channel information 511, program information 521, and program detail information 531 shown in FIG. 5 issued from the program detail information sequential display controller 161. Similarly, the screen 820 shows a state of display of channel information 512, program information 522, and program detail information 532 shown in FIG. 5, and the screen 830 shows a state of display of channel information 513, program information 523, and program detail information 533 shown in FIG. 5.

Thus, the information from the program detail information sequential display controller 161 is sequentially shown in part of the screen at specific time intervals.

As explained already, the synthesizer 132 in the preferred embodiment can be realized in various synthesizing processing methods. In the case that the synthesizer 132 replaces part of the video signal from the video processor 131 merely with program detail signal for display from the program detail information sequential display controller 161, part of the video signal from the video processor 131 may be missing, and the program detail signal for display from the program detail information sequential display controller 161 is fitted in the vacant area. In the case of the synthesizer 132 operating on a superimposing system by weighted summation of video signal and program detail signal for display, the video signal from the video processor 131 is intact, and the program detail signal for display is weighted and superimposed in part of the video signal. In the case of the synthesizer 132 operating on the keying system by chroma key or the like, only the pixel portion having characters or the like of the program detail signal for display is replaced with video signal. In the case of the synthesizer 132 having a function of compressing the video signal from the video processor 131 one-dimensionally or two-dimensionally within the screen, the video signal is compressed one-dimensionally or two-dimensionally in the screen, and the program detail signal for display is fitted in the vacant region formed by this compression.

In FIG. 8, only texts are displayed in the image regions 812, 822, 832. Not limited to texts, in preferred embodiment 1, drawings, moving image and other video information can be also displayed.

As mentioned above, the program detail list information for display issued from the program detail information extractor 151 is specified coded data. Therefore, the program detail information sequential display controller 161 has a function of decoding the coded data into characters, and further converting into image data. The coded data may include related information such as moving image and still image. The program detail information sequential display controller 161 further has a function of decoding such related information and converting into image data.

Figure 9:
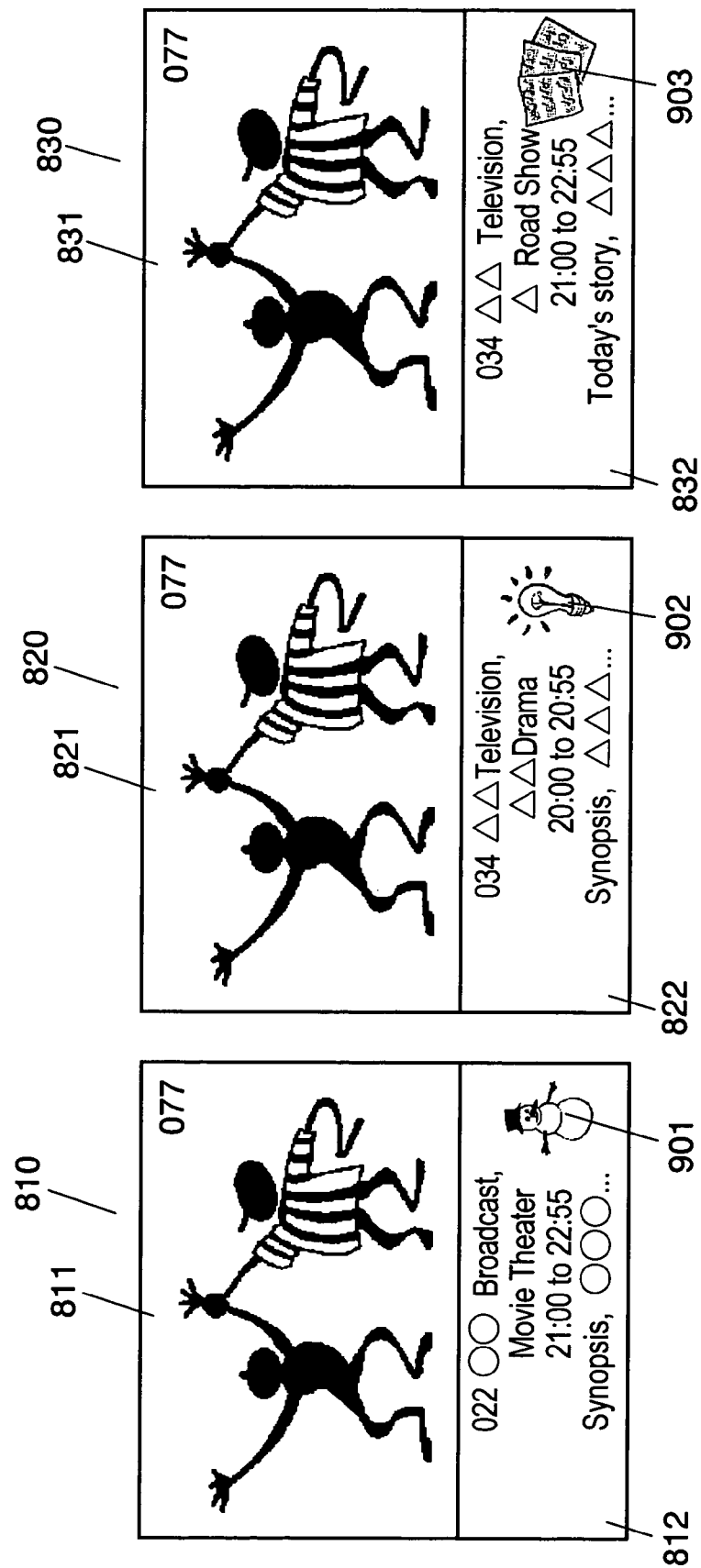
FIG. 9 is a diagram showing other example of a further specific display screen of program detail information in preferred embodiment 1 of the invention.

Examples of displaying drawings, moving image and other video information as well as texts in the image regions 812, 822, 823 are explained by referring to FIG. 2 and FIG. 9.

In FIG. 9, what differs from FIG. 8 is moving images 901 to 903. The moving images 901 to 903 are examples of the video information. In FIG. 9, same parts as in FIG. 8 are identified with same reference numerals, and duplicate explanation is omitted.

As described above, the program detail list information for display issued from the program detail information extractor 151 in FIG. 2 is specified coded data of characters, still image, moving image or objects. Therefore, the program detail information sequential display controller 161 in FIG. 2 has a function of decoding the coded data into characters, still image, moving image or objects, and converting further into image data.

Suppose the program detail list information for display includes information of character and information of moving image. In this case, the program detail information sequential display controller 161 decodes also the information of moving image, and converts into video signal and sends out into the synthesizer 132. The synthesizer 132 synthesizes the character and moving image from the program detail information sequential display controller 161 and the video signal from the video processor 131. That is, in the regions 812, 822, 823 in FIG. 9, moving images 901, 902, 903 are displayed in part respectively.

Thus, by displaying not only characters but also drawings, moving images and other video information, a further wide variety of program information notice is realized.

Preferred Embodiment 2

The foregoing preferred embodiment 1 shows a program detail information display apparatus handling character information or video information as program detail signal for display. This preferred embodiment 2 shows a program detail information display apparatus handling not only character information and video information but also audio information as program detail signal for display. The preferred embodiment 2 is explained by referring to FIG. 10 and FIG. 11.

Figure 10:
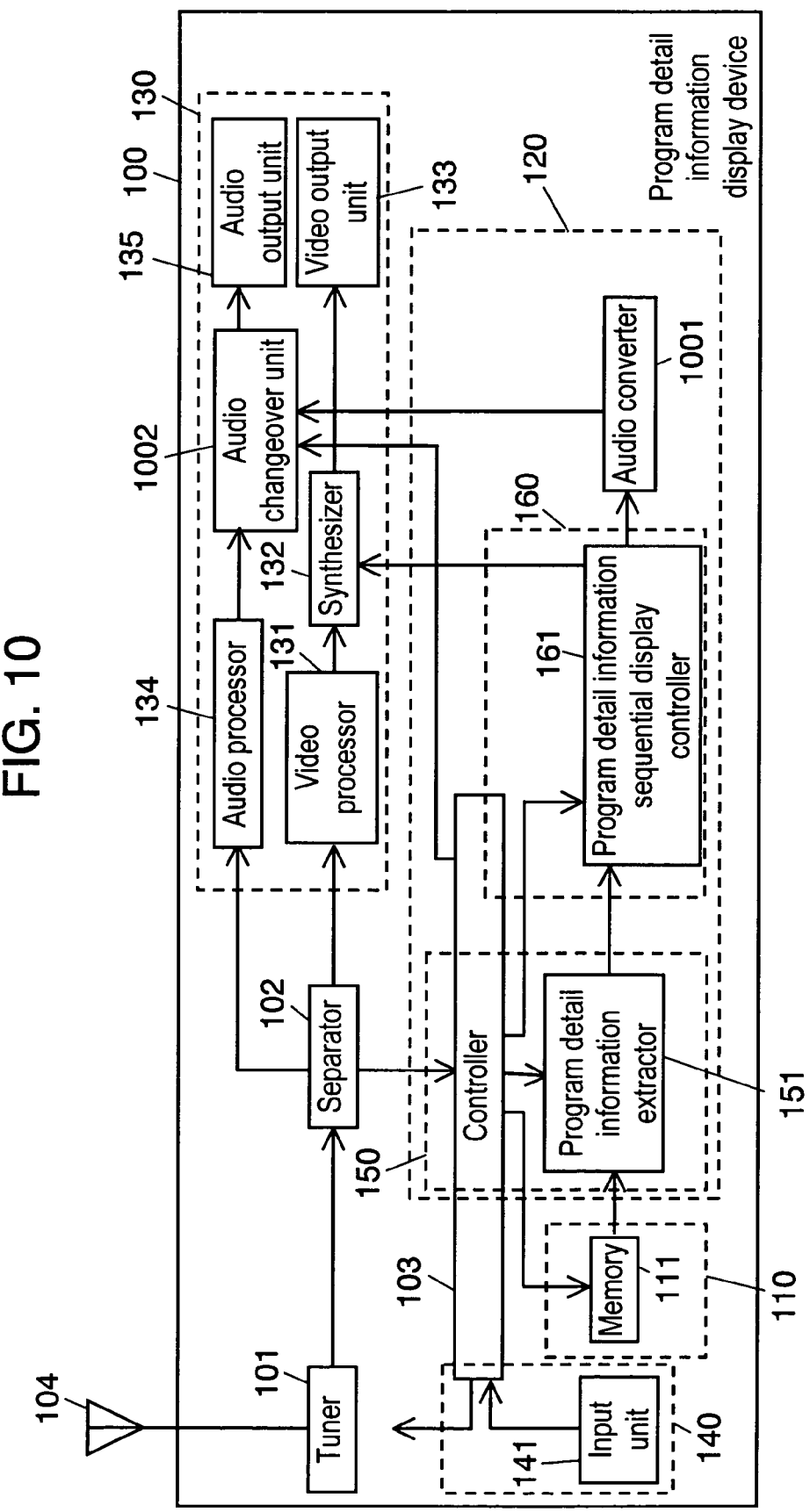
FIG. 10 is a specific system block diagram of program detail information display apparatus in preferred embodiment 2 of the invention.

FIG. 10 is a system block diagram of program detail information display apparatus in preferred embodiment 2 of the invention. In FIG. 10, what differs from FIG. 2 lies in an audio converter 1001 and an audio changeover unit 1002. In FIG. 10, same parts as in FIG. 2 are identified with same reference numerals and duplicate explanation is omitted.

The program detail information sequential display controller 161 creates program detail data for display on the basis of the program detail list information for display from the program detail information extractor 151, and converts the program detail data for display into program detail signal for display, and issues to the synthesizer 132. The program detail information sequential display controller 161 further feeds the created program detail data for display to the audio converter 1001.

The audio converter 1001 converts the portion of character information contained in the input data of program detail data for display into audio information corresponding to the characters. That is, the audio converter 1001 has a so-called voice synthesizing function. The audio converter 1001 converts the created audio information into analog audio signal, and sends to the audio changeover unit 1002.

The audio processor 134 decodes the digital audio signal data stream supplied from the separator 102, and issues analog audio signal to the audio changeover unit 1002.

The audio changeover unit 1002 changes over the audio signal entered from the audio converter 1001 and the audio signal entered from the audio processor 134 properly, and sends to the audio output unit 135.

The audio changeover unit 1002 in this preferred embodiment 2 operates in various systems, including a system of merely changing over the audio signal entered from the audio converter 1001 and the audio signal entered from the audio processor 134, a system of changing over these two audio signals by fade-in and fade-out method, and a system of synthesizing these two audio signals by weighted summation. In the system of changing them over merely, the audio changeover unit 1002 is composed of a single selection circuit of the audio signal entered from the audio converter 1001 and the audio signal entered from the audio processor 134. In the changeover system by fade-in and fade-out method, the audio changeover unit 1002 is composed of a circuit for changing over by adding while changing the gain of the two at the changeover timing of the audio signal entered from the audio converter 1001 and the audio signal entered from the audio processor 134. In the system of weighted summation of the two, the audio changeover unit 1002 is composed of a circuit for adding by weighting the both signals in the input period of the signal from the audio converter 1001.

In this explanation, the audio changeover unit 1002 changes over the analog audio signal from the audio processor 134 and the analog audio signal from the audio converter 1001. However, the audio processor 134 may issue a digital audio signal and the audio converter 1001 may also issue a digital audio signal, and the audio changeover unit 1002 can also change over the digital audio signal from the audio processor 134 and the digital audio signal from the audio converter 1001.

Figure 11:
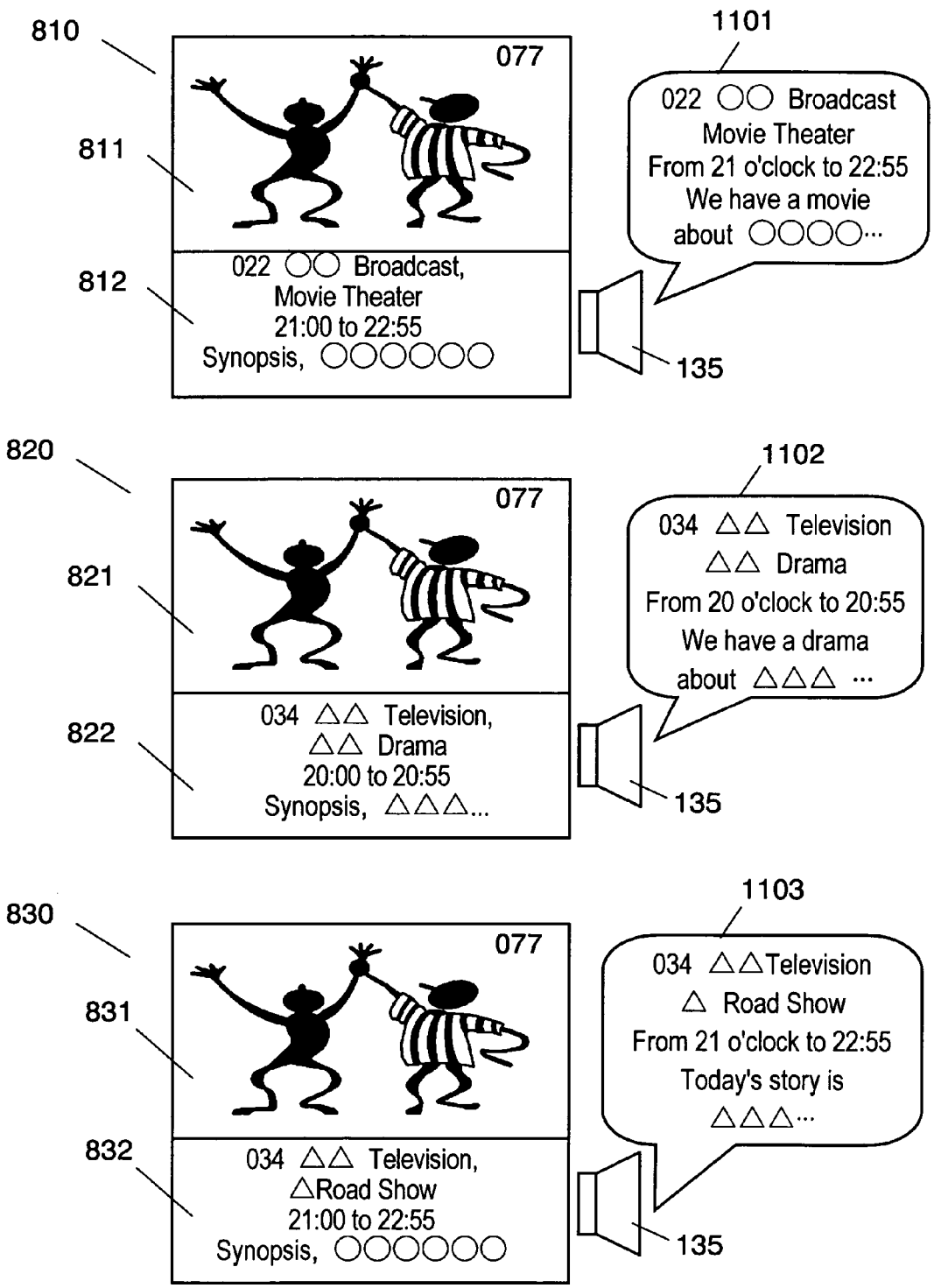
FIG. 11 is a diagram showing an example of a display screen of program detail information in program detail information display apparatus in preferred embodiment 2 of the invention.
Figure 12:
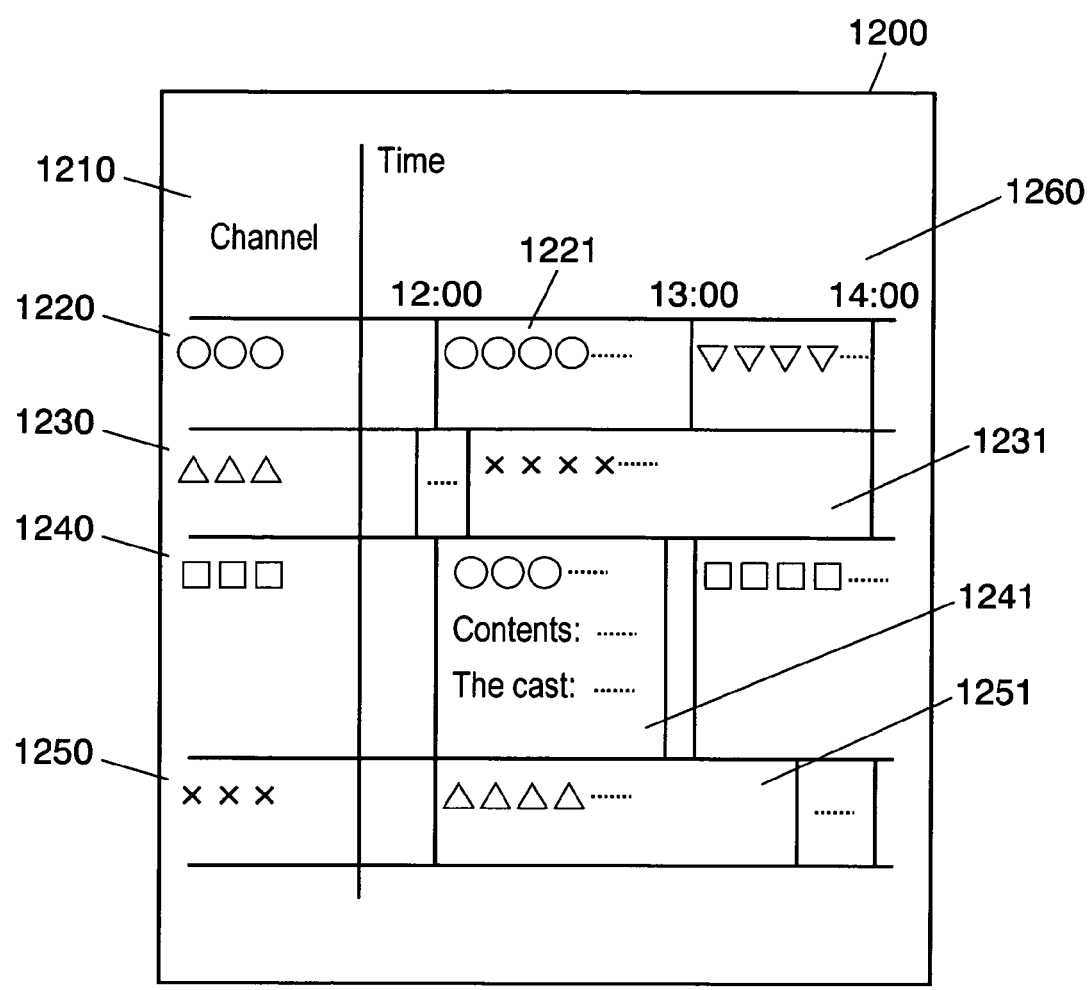
FIG. 12 is a diagram showing a display screen of program detail information in program detail information display apparatus in a prior art.

An example of screen displayed in the video output unit 133 and voice produced from the audio output unit 135 in FIG. 10 is explained by referring also to FIG. 11.

In FIG. 11, what differs from FIG. 8 and FIG. 9 lies in voice 1101 to 1103 and audio output unit 135. The audio output unit 135 is same as the audio output unit 135 shown in FIG. 10. In FIG. 11, same parts as in FIG. 8 and FIG. 9 are identified with same reference numerals and duplicate explanation is omitted.

As shown in FIG. 11, while the information from the program detail information sequential display controller 161 is displayed in the image region 812, the voice 1101 corresponding to the display content is delivered from the audio output unit 135. Similarly, while the information from the program detail information sequential display controller 161 is displayed in the image region 822, the voice 1102 corresponding to the display content is delivered from the audio output unit 135, and while the information from the program detail information sequential display controller 161 is displayed in the image region 832, the voice 1103 corresponding to the display content is delivered from the audio output unit 135.

Thus, in preferred embodiment 2, not only the information from the program detail information sequential display controller 161 is displayed in the video output unit 133, but also the voice corresponding to the display content is delivered from the audio output unit 135, so that the function for getting information about the program by the user is further enhanced.

As explained herein, the program detail information display apparatus of the invention is enhance in efficiency of selection of program by the viewer by receiving a program detail information display command from the viewer by remote control or other operation, extracting the program detail information from the program data stored in the storage means, creating program detail data for display using image or voice together with the channel information and program information, and displaying sequentially.

Further, by displaying only the program detail information greater than specified data quantity, a special program recommended by the program provider can be efficiently presented to the viewer as recommended program.

Simultaneously with the on-air image, the program detail information can be also displayed.

INDUSTRIAL APPLICABILITY

The program detail information display apparatus of the invention comprises program detail information sequential display control means for issuing the program detail information extracted by the program detail information extracting means sequentially to the display means, and hence the efficiency of selection of program by the viewer can be enhanced. Further, the program detail information extracting means of the program detail information display apparatus of the invention extracts only the program detail information greater than specified size, so that a recommended program can be efficiently presented to the viewer.

The invention claimed is:

1. A program detail information display apparatus comprising:
    display means;
    storage means for storing program data;
    program detail information extracting means for:
        a) extracting program detail information from the program data stored in the storage means in response to the program detail information being greater than a predetermined number of bytes, and
        b) not extracting program detail information from the program data stored in the storage means in response to the program detail information being less than or equal to the predetermined number of bytes; and
    program detail information sequential display control means for issuing the program detail information extracted by the program detail information extracting means sequentially to the display means,
    wherein the predetermined number of bytes is greater than zero.

2. The program detail information display apparatus of claim 1,
    wherein the program detail information sequential display control means issues the program detail information extracted by the program detail information extracting means automatically and sequentially to the display means at specified time intervals.

3. The program detail information display apparatus of claim 1, further comprising command receiving means for receiving a command,
wherein the program detail information sequential display control means issues the program detail information extracted by the program detail information extracting means sequentially to the display means at the timing controlled by the command receiving means.

4. The program detail information display apparatus of claim 1,
wherein the program detail information extracting means extracts further related information relating to the program detail information greater than a specified size from the program data; and
wherein the program detail information sequential display control means issues the program detail information and related information extracted by the program detail information extracting means sequentially to the display means.

5. The program detail information display apparatus of claim 1,
wherein the display means comprises:
a video processor for restoring video signal on the basis of video data stream;
a synthesizer;
a video output part for displaying the image by receiving the output from the synthesizer;
an audio processor for restoring audio signal on the basis of audio data stream; and
an audio output part for issuing a voice by receiving the audio signal,
wherein the storage means is composed of a memory part controlled by a controller;
wherein the program detail information extracting means comprises:
the controller; and
a program detail information extractor for extracting program detail information greater than a specified size from the memory part by an instruction from the controller; and
wherein the program detail information sequential display control means comprises;
the controller; and
a program detail information sequence controller for sequentially controlling the program detail information from the program detail information extractor by an instruction from the controller; and
wherein the synthesizer synthesizes the output of the video processor and the output of the program detail information sequence controller.

6. The program detail information display apparatus of claim 1,
wherein the display means comprises:
a video processor for restoring video signal on the basis of video data stream;
a synthesizer;
a video output part for displaying an image by receiving the output from the synthesizer;
an audio processor for restoring audio signal on the basis of audio data stream;
an audio changeover part for changing over audio signals; and
an audio output part for issuing a voice by receiving the audio signal from the audio changeover part,
wherein the storage means is composed of a memory part controlled by a controller;
wherein the program detail information extracting means comprises:
the controller; and
a program detail information extractor for extracting the program detail information greater than a specified size from the memory part by an instruction from the controller;
wherein the program detail information sequential display control means comprises:
the controller; and
a program detail information sequence controller for sequentially controlling the program detail information from the program detail information extractor by an instruction from the controller,
further comprising an audio converter for converting into an audio signal on the basis of the information from the program detail information sequence controller,
wherein the synthesizer synthesizes the output of the video processor and the output of the program detail information sequence controller; and
wherein the audio changeover part changes over the output of the audio processor and the output of the audio converter.

7. The program detail information display apparatus of claim 5, wherein the synthesizer replaces part of the output of the video processor with the output of the program detail information sequence controller.

8. The program detail information display apparatus of claim 5, wherein the synthesizer sums the output of the video processor and the output of the program detail information sequence controller by weighting.

9. The program detail information display apparatus of claim 5, wherein the synthesizer processes the output of the video processor and the output of the program detail information sequence controller by keying.

10. The program detail information display apparatus of claim 5, wherein the synthesizer has a function of displaying the output image of the video processor by compressing one-dimensionally or two-dimensionally, and a vacant space produced by compression is replaced by the output of the program detail information sequence controller.

11. A program detail information display method comprising:
a step of displaying at least video data;
a step of storing program data;
an extracting step of:
a) extracting program detail information from the stored program data in response to the program detail information being greater than a predetermined number of bytes, and
b) not extracting program detail information from the program data in response to the program detail information being less than or equal to the predetermined number of bytes; and
a step of controlling sequentially so as to issue sequentially the program detail information extracted at the step of extracting the program detail information to the step of displaying,
wherein the predetermined number of bytes is greater than zero.

12. The program detail information display method of claim 11,
wherein the step of extracting the program detail information extracts further the related information relating to the program detail information greater than a specified size from the program data; and wherein the step of controlling sequentially issues the program detail information and related information extracted at the step of extracting the program detail information sequentially to the step of displaying.

13. The program detail information display apparatus of claim 6, wherein the synthesizer replaces part of the output of the video processor with the output of the program detail information sequence controller.

14. The program detail information display apparatus of claim 6, wherein the synthesizer sums the output of the video processor and the output of the program detail information sequence controller by weighting.

15. The program detail information display apparatus of claim 6, wherein the synthesizer processes the output of the video processor and the output of the program detail information sequence controller by keying.

16. The program detail information display apparatus of claim 6, wherein the synthesizer has a function of displaying the output image of the video processor by compressing one-dimensionally or two-dimensionally, and a vacant space produced by compression is replaced by the output of the program detail information sequence controller.

17. The program detail information display apparatus of claim 1, wherein the predetermined number of bytes is variable to control the program detail information that is displayed.

* * * * *